United States Patent
Comert et al.

(10) Patent No.: US 8,821,981 B2
(45) Date of Patent: Sep. 2, 2014

(54) POLYURETHANE GASKETS AND PROCESS FOR FORMING SAME

(75) Inventors: Ahmet Comert, Herve (BE); Georges Moineau, Battice (BE); Dino Manfredi, Lummen (BE)

(73) Assignee: Saint-Gobain Performance Plastics Chaineux, Chaineux (BE)

( * ) Notice: Subject to any disclaimer, the term of this patent is extended or adjusted under 35 U.S.C. 154(b) by 797 days.

(21) Appl. No.: 12/842,693

(22) Filed: Jul. 23, 2010

(65) Prior Publication Data

US 2011/0020549 A1    Jan. 27, 2011

Related U.S. Application Data

(60) Provisional application No. 61/228,455, filed on Jul. 24, 2009.

(51) Int. Cl.
*B05D 1/34*    (2006.01)
*B05D 1/36*    (2006.01)
*B05D 3/10*    (2006.01)
*B05D 1/02*    (2006.01)

(52) U.S. Cl.
USPC ........... 427/302; 427/301; 427/337; 427/340; 427/373; 427/426; 427/427.3; 427/427.4

(58) Field of Classification Search
USPC ......... 427/301, 302, 373, 337, 340, 336, 426, 427/427.4, 427.3
See application file for complete search history.

(56) References Cited

U.S. PATENT DOCUMENTS

| | | | | |
|---|---|---|---|---|
| 4,309,990 A | * | 1/1982 | Brooks et al. | 602/8 |
| 4,596,725 A | * | 6/1986 | Kluth et al. | 427/385.5 |
| 4,758,648 A | | 7/1988 | Rizk et al. | |
| 4,780,520 A | | 10/1988 | Rizk et al. | |
| 5,705,547 A | | 1/1998 | Richards et al. | |
| 5,723,534 A | | 3/1998 | Murray | |
| 5,880,167 A | * | 3/1999 | Krebs et al. | 521/155 |
| 6,210,753 B1 | * | 4/2001 | Vohs | 427/244 |
| 6,305,143 B1 | | 10/2001 | Streets et al. | |
| 2001/0037616 A1 | * | 11/2001 | Diamond | 52/202 |
| 2002/0156141 A1 | | 10/2002 | Kelly | |
| 2003/0050354 A1 | | 3/2003 | Gilman | |
| 2005/0248102 A1 | | 11/2005 | Sato | |

(Continued)

FOREIGN PATENT DOCUMENTS

| | | |
|---|---|---|
| DE | 4124338 A1 | 1/1993 |
| DE | 4441570 A1 | 5/1996 |

(Continued)

OTHER PUBLICATIONS

Avanti; "Expanded Gasket Placement Technique, EGP Technical Manual"; © 2005 by Avanti International; 8 pages. <http://www.avantigrout.com/egp2.html>.

(Continued)

*Primary Examiner* — Kirsten Jolley
(74) *Attorney, Agent, or Firm* — Abel Law Group, LLP; Chi Suk Kim (57) ABSTRACT

A method of forming a seal includes preparing a froth from a one component polyurethane precursor, applying the froth to a surface of an article, and simultaneously applying water with the froth, the froth curing to form a gasket having a density not greater than 350 kg/m³ bonded to the article.

27 Claims, 2 Drawing Sheets

(56) References Cited

U.S. PATENT DOCUMENTS

| | | |
|---|---|---|
| 2006/0079589 A1 | 4/2006 | Tadokoro |
| 2006/0189240 A1* | 8/2006 | Taylor et al. ............ 442/320 |
| 2007/0197674 A1 | 8/2007 | Jennings et al. |

FOREIGN PATENT DOCUMENTS

| | | |
|---|---|---|
| EP | 1159325 B1 | 4/2003 |
| JP | S61-237610 A | 10/1986 |
| JP | 63-120721 A | 5/1988 |
| JP | 1261412 A | 10/1989 |
| JP | 05-075035 B | 10/1993 |
| JP | H10-003807 A | 1/1998 |
| JP | 2000-336341 A | 12/2000 |
| JP | 2001348416 A | 12/2001 |
| JP | 2004-251007 A | 9/2004 |
| JP | 2004-251008 A | 9/2004 |
| JP | 2004-251009 A | 9/2004 |
| JP | 4030893 B2 | 1/2007 |
| JP | 2004251010 B | 11/2007 |
| JP | 4027817 B2 | 12/2007 |
| JP | 2008-006592 A | 1/2008 |
| JP | 4033784 B2 | 1/2008 |
| JP | 2010-174146 A | 8/2010 |
| TW | 200527085 A | 8/2005 |
| WO | 2008082474 A1 | 7/2008 |

OTHER PUBLICATIONS

Dynafoam® 7440; "Robotically Applied Foam-In-Place Gasketing Material"; Apr. 2009; © 2009 Saint-Gobain Performance Plastics Corporation 2 pages. <www.dynafoam.eu>.

Dynafoam® 7440; "Robotically Applied Foam-In-Place Gasketing Material"; Prior to Apr. 2009; © 2009 Saint-Gobain Performance Plastics Corporation 2 pages. <www.dynafoam.eu>.

Huntsman; "Performance Products, JEFFCAT® catalysts Europe, Africa and Middle East Region"; Copyright © 2009 Huntsman Corporation; 5 pages. <www.huntsman.com/performance_products>.

"Lupranate® MP102, Modified MDI"; Technical Bulletin; May 2004; © 2004 BASF Corporation; 1 page. <http://www.basf.com/usa>.

Elastogran GmbH "Lupranat® MP 102"; Technical Bulletin; Version 2; Edition 05.03; ® = registered trade mark of Elastogran; 3 pages.

Elastogran GmbH "Lupranol® 2090" Technical Data Sheet, Version 6; Edition 03.05; ® = registered trade mark of Elastogran; 3 pages.

Elastogran GmbH "Lupranol® 4800 N" Technical Data Sheet, Version 1; Edition 07.05; ® = registered trade mark of Elastogran; 3 pages.

Kayed, J., "Application of Foam-In-Place Gaskets," Gummi Fasern Kunststoffe, vol. e 50, No. 12, Dec. 1997, p. 967-73, Abstract only.

International Search Report from PCT Application No. PCT/EP2010/060698, filed Jul. 23, 2010, 2 pgs.

* cited by examiner

POLYURETHANE GASKETS AND PROCESS FOR FORMING SAME

CROSS-REFERENCE TO RELATED APPLICATION(S)

The present application claims priority from U.S. Provisional Patent Application No. 61/228,455, filed Jul. 24, 2009, entitled "POLYURETHANE GASKETS AND PROCESS FOR FORMING SAME," naming inventor Ahmet Comert, Georges Moineau, and Dino Manfredi, which application is incorporated by reference herein in its entirety.

FIELD OF THE DISCLOSURE

This disclosure in general relates to polyurethane gaskets and methods for forming such polyurethane gaskets.

BACKGROUND

Polyurethane foams have been used to form seals and gaskets in a variety of industries, such as the automotive industry, the appliance industry, the aerospace industry, and the electronics industry. Polyurethane foams can be used to form gaskets through various techniques such as foam-in-place methods, molded methods, or transfer molding methods. Further, polyurethanes can be used in a variety of densities ranging from high densities to low densities.

In particular, polyurethane may be formed using a two component system or a one component system. In a conventional two component system, a polyol component and a diisocyanate component are mixed immediately prior to use. As such, two component systems have disadvantages including difficulties associated with strict control of stoichiometric mixing of the components and difficulties associated with clearing lines and cleaning equipment to prevent cure of the polyurethane within a dispensing system.

Alternatively, one component polyurethane systems can be used, which are conventionally cured in the presence of water. One component polyurethane components can be mixed with water prior to dispensing or can be moisture cured after dispensing. Moisture cured one component polyurethane foams conventionally rely on high humidity boxes to facilitate curing. Such high humidity boxes occupy a significant amount of space within a factory producing large numbers of components. In addition, such high humidity boxes utilize a significant amount of energy to both maintain a high temperature within the box, as well as to maintain a high humidity within the box by evaporating moisture. In times of increased concern over the environmental impact of energy production, the significant energy usage of high humidity boxes has a negative impact on the environmental impact of a manufacturing facility. In addition, high humidity box equipment represents a significant investment cost.

As such, an improved polyurethane gasket and method of forming such a gasket would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

In a particular embodiment, a gasket may be formed by frothing a one-component (1K) polyurethane precursor, applying the froth over a surface of an article, and externally applying water, such as through spraying water in proximity to the froth. For example, water may be sprayed over a surface of the article or within a groove of the article, the froth may be applied over the moist surface, and additional water may be applied over the dispensed froth. The froth may be cured in place to form a gasket having a density of not greater than 500 kg/m$^3$. In addition, the polyurethane foam of the gasket may have an open or closed cell configuration.

In particular, curing may be performed in ambient conditions, absent from artificially raised humidity. Herein, artificially raised temperatures and humidity are considered to be a relative humidity of greater than 65% at temperatures in excess of 40° C. In a further example, the froth includes a 1K polyurethane precursor having an amine catalyst in an amount of 0.2 wt % to 1.8 wt %.

The one component polyurethane precursor is the reaction product of a polyol and an excess amount of an isocyanate component, resulting in a polyurethane precursor terminated with isocyanate groups. In the presence of water, a portion of the isocyanate groups are converted into amine groups, which will react with the remaining isocyanate groups resulting in a chemically crosslinked polyurethane network. The carbon dioxide released during this process may help the foaming process.

In an example, the polyol may be a polyether polyol, a polyester polyol, modified or grafted derivatives thereof, or any combination thereof. A suitable polyether polyol can be produced by polyinsertion via double metal cyanide catalysis of alkylene oxides, by anionic polymerization of alkylene oxides in the presence of alkali hydroxides or alkali alcoholates as catalysts and with the addition of at least one initiator molecule containing 2 to 6, preferably 2 to 4, reactive hydrogen atoms in bonded form, or by cationic polymerization of alkylene oxides in the presence of Lewis acids, such as antimony pentachloride or boron fluoride etherate. A suitable alkylene oxide may contain 2 to 4 carbon atoms in the alkylene radical. An example includes tetrahydrofuran, 1,2-propylene oxide, 1,2- or 2,3-butylene oxide; ethylene oxide, 1,2-propylene oxide, or any combination thereof. The alkylene oxides can be used individually, in succession, or as a mixture. In particular, mixtures of 1,2-propylene oxide and ethylene oxide may be used, whereby the ethylene oxide is used in quantities of 10% to 50% as an ethylene oxide terminal block so that the resulting polyols display over 70% primary OH terminal groups. An example of an initiator molecule includes water or dihydric or trihydric alcohols, such as ethylene glycol, 1,2-propanediol and 1,3-propanediol, diethylene glycol, dipropylene glycol, ethane-1,4-diol, glycerol, trimethylol propane, or any combination thereof.

Suitable polyether polyols, such as polyoxypropylene polyoxyethylene polyols, have average functionalities of 1.5 to 4, such as 2 to 3, and number-average molecular weights of 800 g/mol to 25,000 g/mol, such as 800 g/mol to 14,000 g/mol, particularly 2,000 g/mol to 9,000 g/mol.

In another example, the polyol may include a polyester polyol. In an exemplary embodiment, a polyester polyol is derived from dibasic acids such as adipic, glutaric, fumaric, succinic or maleic acid, or anhydrides and di-functional alcohols, such as ethylene glycol, diethylene glycol, propylene glycol, di or tripropylene glycol, 1-4 butane diol, 1-6 hexane diol, or any combination. For example, the polyester polyol may be formed by the condensation reaction of the glycol and the acid with the continuous removal of the water by-product. A small amount of high functional alcohol, such as glycerin, trimethanol propane, pentaerythritol, sucrose or sorbitol or polysaccharides may be used to increase branching of the polyester polyol. The esters of simple alcohol and the acid may be used via an ester interchange reaction where the simple alcohols are removed continuously like the water and replaced by one or more of the glycols above. Additionally, polyester polyols may be produced from aromatic acids, such as terephthalic acid, phthalic acid, 1,3,5-benzoic acid, their anhydrides, such as phthalic anhydride. In a particular example, the polyol may include an alkyl diol alkyl ester. For example, the alkyl diol alkyl ester may include trimethyl pentanediol isobutyrate, such as 2,2,4-trimethyl-1,3-pentanediol isobutyrate.

In a particular embodiment, the polyol may be a multifunctional polyol having at least two primary hydroxyl groups. For example, the polyol may have at least three primary hydroxyl groups. In a particular example, the polyol is a polyether polyol having an OH number in the range of 5 mg KOH/g to 70 mg KOH/g, such as a range of 10 mg KOH/g to 70 mg KOH/g, a range of 10 mg KOH/g to 50 mg KOH/g, or even 15 mg KOH/g to 40 mg KOH/g. In a further example, the polyether polyol may be grafted. For example, the polyol may be a polyether polyol grafted with styrene-acrylonitrile. In a further example, the polyol may include a blend of multifunctional, such as trifunctional polyether polyols, and polyols that are grafted, such as a polyether polyol having a grafted styrene-acrylonitrile moiety. In particular, the polyol is a polyether polyol, available under the trade name Lupranol® available from Elastogran by BASF Group.

The isocyanate component may be derived from a variety of diisocyanates. An exemplary diisocyanate monomer may include toluene diisocyanate, m-phenylene diisocyanate, p-phenylene diisocyanate, xylene diisocyanate, 4,4'-diphenylmethane diisocyanate, hexamethylene diisocyanate, isophorone diisocyanate, polymethylene polyphenyl diisocyanate, 3,3'-dimethyl-4,4'-biphenylene diisocyanate, 3,3'-dimethyl-4,4'-diphenylmethane diisocyanate, 3,3'-dichloro-4,4'-biphenylene diisocyanate, or 1,5-naphthalene diisocyanate; their modified products, for instance, carbodiimide-modified products; or the like, or any combination thereof. Such diisocyanate monomers may be used alone or in admixture of at least two kinds. In a particular example, the isocyanate component may include methylene diphenyl diisocyanate (MDI), toluene diisocyanate (TDI), hexamethylene diisocyanate (HDI), isophorone diisocyanate (IPDI), or any combination thereof. In an example, the isocyanate may include methylene diphenyl diisocyanate (MDI) or toluene diisocyanate (TDI). In particular, the isocyanate includes methylene diphenyl diisocyanate (MDI) or derivatives thereof.

The diisocyanate may have an average functionality in a range of about 2.0 to 2.9, such as a functionality of between 2.0 and 2.7. Further, the diisocyanate may have an NCO content in the range of 5% to 35%, such as the range of 10% to 30%.

In a particular embodiment, the isocyanate component may be a modified methylene diphenyl diisocyanate (MDI). In a further example, a diisocyanate may include a mixture of diisocyanates, such as a mixture of modified methylene diphenyl diisocyanates. An exemplary diisocyanate is available under the tradename Lupranate®, available from Elastogran by the BASF Group.

In addition, the 1K polyurethane precursor may include a catalyst. The catalyst may include an organometallic catalyst, an amine catalyst, or a combination thereof. An organometallic catalyst, for example, may include dibutyltin dilaurate, a lithium carboxylate, tetrabutyl titanate, a bismuth carboxylate, or any combination thereof.

The amine catalyst may include a tertiary amine, such as tributylamine, N-methyl morpholine, N-ethyl morpholine, N,N,N',N'-tetramethyl ethylene diamine, pentamethyl diethylene triamine and higher homologues, 1,4-diazabicyclo-[2,2,2]-octane, N-methyl-N'-dimethylaminoethyl piperazine, bis(dimethylaminoalkyl)piperazine, N,N-dimethyl benzylamine, N,N-dimethyl cyclohexylamine, N,N-diethyl benzylamine, bis(N,N-diethylaminoethyl) adipate, N,N,N',N'-tetramethyl-1,3-butane diamine, N,N-dimethyl-β-phenylethylamine, bis(dimethylaminopropyl)urea, bis(dimethylaminopropyl)amine, 1,2-dimethyl imidazole, 2-methyl imidazole, monocyclic and bicyclic amidine, bis(dialkylamino)alkyl ether, such as e.g., bis(dimethylaminoethyl)ethers, tertiary amines having amide groups (such as formamide groups), or any combination thereof. Another example of a catalyst component includes Mannich bases including secondary amines, such as dimethylamine, or aldehyde, such as formaldehyde, or ketone such as acetone, methyl ethyl ketone or cyclohexanone or phenol, such as phenol, nonyl phenol or bisphenol. A catalyst in the form of a tertiary amine having hydrogen atoms that are active with respect to isocyanate groups may include triethanolamine, triisopropanolamine, N-methyldiethanolamine, N-ethyl diethanolamine, N,N-dimethyl ethanolamine, reaction products thereof with alkylene oxides such as propylene oxide or ethylene oxide, or secondary-tertiary amines, or any combination thereof. Silamines with carbon-silicon bonds can also be used as catalysts, for example, 2,2,4-trimethyl-2-silamorpholine, 1,3-diethyl aminomethyl tetramethyl disiloxane, or any combination thereof.

In a further example, the amine catalyst is selected from a pentamethyl diethylene triamine, dimethylaminopropylamine, N,N' dimethylpiperazine and dimorpholinoethylether, N,N' dimethyl aminoethyl N-methyl piperazine, JEFFCAT®DM-70 (a mixture of N,N' dimethylpiperazine and dimorpholinoethylether), imadozoles, triazines, or any combination thereof.

In a particular embodiment, the catalyst is particularly useful for activating blowing reactions, such as a reaction of isocyanate with water. In an example, the catalyst includes dimorpholinodiethyl ether (DMDEE). In a particular example, the catalyst includes a stabilized version of DMDEE.

An example composition includes the polyol in an amount in the range of 50 wt % to 80 wt %, such as a range of 55 wt % to 75 wt %, or even a range of 60 wt % to 70 wt %. The diisocyanate may be included in an amount in a range of 20 wt % to 35 wt %, such as a range of 22 wt % to 32 wt %, or even a range of 25 wt % to 30 wt %. The catalyst, and in particular a humidifier curing catalyst, may be included in an amount of 0.2 wt % to 2.0 wt %, such as a range of 0.6 wt % to 1.8 wt %, a range of 0.8 wt % to 1.8 wt %, or even a range of 1.0 wt % to 1.5 wt %.

In addition, the composition may include additives such as pigments, surfactants, filler, plasticizers, anti-yellowing agents, stabilizers, adhesion promoters, or any combination thereof. In an example, the composition may include a pigment. The pigment may be organic or inorganic and may be used as such or as predispersed concentrate. In another example, the pigment may include inorganic metal oxides, such as titania, zirconia, tin oxide, alumina, or any combination thereof. In a further example, the pigment may include carbon black or graphite. Depending on the nature of the pigment, the pigment may be included in amounts ranging from 0.01 wt % to 5 wt %. For example, a pigment may be included in an amount in a range of 0.01 wt % to 4 wt %, such as a range of 0.01 wt % to 3 wt %, or even a range of 0.1 wt % to 0.25 wt %.

In addition, the formulation may include one or more thixotropic agents, such as synthetic silica or alumina. For example, thixotropic agent may be included in a range of 0.1 wt % to 5 wt %, such as 0.5 wt % to 4 wt %, or even 0.5 wt % to 3 wt %.

In an exemplary embodiment, the components are blended while reacting at a temperature in a range of 20° C. to 100° C. under dry conditions. In an example, the isocyanate component is added over an extended period at the beginning of the reaction, such as over a 20 minute period. Following the reaction, the one-component polyurethane precursor is placed in a container and contact with moisture is limited to prevent premature curing. The one-component polyurethane precursor may have a shelf-life of at least 3 months, such as at least 6 months.

Figure 1:
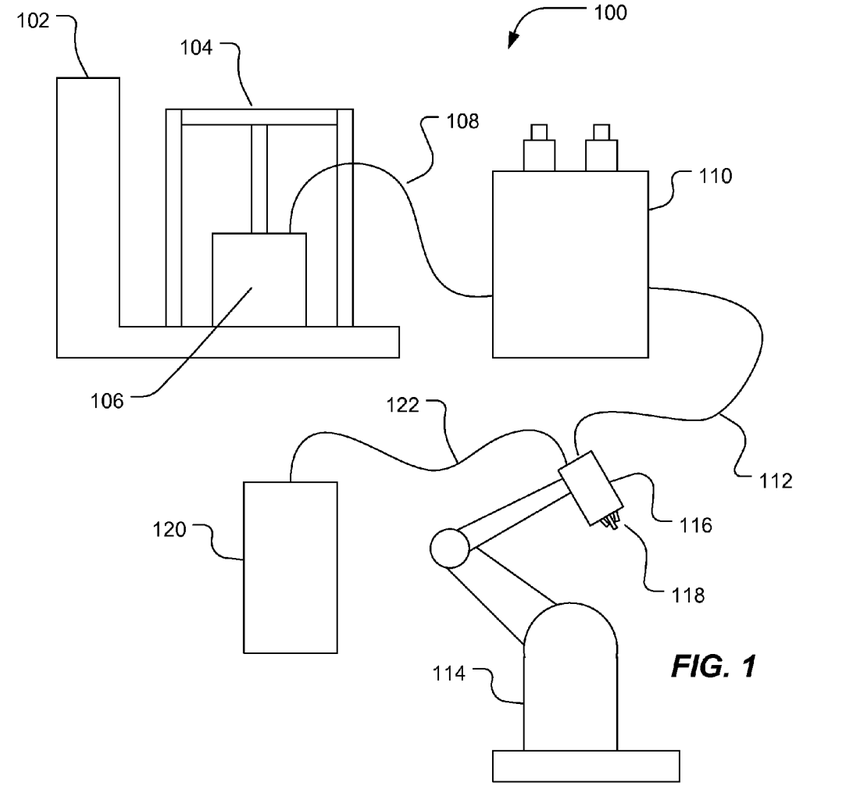
FIG. 1 includes an illustration of an exemplary application system for forming a gasket.

FIG. 1 includes an illustration of an exemplary application system for forming a gasket from a froth formed of a one-component polyurethane precursor. For example, the system 100 includes a dispenser 102 configured to dispense a one-component polyurethane precursor to a frothing apparatus 110, which froths the polyurethane and provides the froth to an applicator 114. In addition, the system 100 may include a water source 120 that provides water to the applicator 114. The system may further include equipment (not illustrated) to treat a surface of an article.

In an example, the dispenser 102 dispenses polyurethane from a container 106. For example, the dispenser 102 may include a piston 104 and may heat and pressurize a one-component polyurethane precursor, forcing the liquefied polyurethane precursor through tube or hose 108 to the frothing apparatus 110. The unfoamed one-component precursor may have a viscosity in the range of 30 Pa-s to 250 Pa-s when measured at 40° C., such 30 Pa-s to 200 Pa-s, or even 30 Pa-s to 150 Pa-s. The frothing mechanism 110 supplies clean dry gas, such as air or nitrogen, under low or high pressure and mixes the gas and polyurethane precursor to form a froth.

In particular, the one-component polyurethane is heated to reduce viscosity and supplied to a frothing apparatus 110. The froth is formed to include at least 5% by volume of the inert gas, such as at least 10% by volume, at least 15% by volume, or even at least 20% by volume. For example, the inert gas may include dry air or nitrogen.

The froth may be dispensed on to a surface of an article, within a groove of an article, or into a mold. In an example, the froth is supplied via tube or hose 112 to a head 116 of the applicator 114. The froth is dispensed from the dispensing end 118 of the head 116. In a particular example, the applicator 114 is capable of moving along multiple axes, permitting the application or dispensing of the froth along complex pathways.

In addition, water may be supplied via hose or tube 122 from a water source 120 to the head 116 of the applicator 114. While the froth is being dispensed, water may also be dispensed in proximity to the dispensed froth, such as under the froth, on top of or over the froth, or both. In particular, the water is applied, such as sprayed, simultaneously with the froth and separately from the dispensing of the froth.

Figure 2:
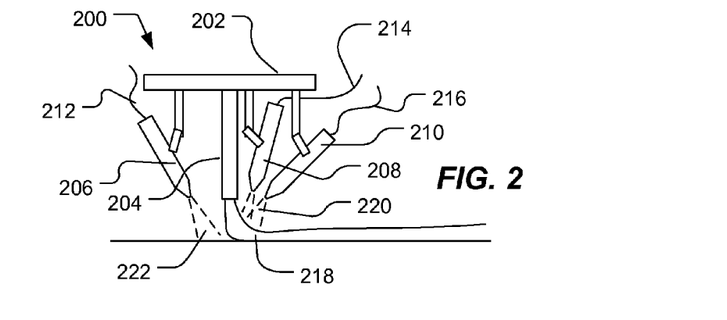
FIG. 2 includes an illustration of an exemplary dispensing head for forming a gasket.

For example, FIG. 2 includes an illustration of a dispensing end 200 of the applicator. A tube or nozzle 204 may dispense the polyurethane froth. In addition, nozzles 206, 208 and 210 may dispense water in proximity to the dispensed froth. Water may be supplied to the nozzles 206, 208 and 210 via supply lines 212, 214 and 216. In the illustrated example, three nozzles (206, 208, and 210) configured to spray water extend from or are attached to the dispensing platform 202. Alternatively, the dispensing platform 202 may include at least one nozzle to dispense water, such as at least two nozzles, at least three nozzles, or even four or more nozzles.

As illustrated in FIG. 2, the froth dispensing tube or nozzle 204 dispenses a froth 218 over a surface. The froth 218 may be dispensed over a flat surface or into a groove. The nozzle 206 dispenses water 222 over the surface prior to the dispensing of the polyurethane froth 218. In addition, nozzles, such as nozzles 208 and 210, dispense water 220 in proximity to the dispensed froth, such as over or on the dispensed froth 218.

In a particular example, the water nozzles (206, 208, and 210) are circumferentially distributed at even intervals around the platform 202. Such an arrangement is conducive to dispensing froth over complex pathways, providing for water dispensed in advance of the dispensed froth and after the froth is dispensed. Alternatively, the nozzles may be arranged at uneven intervals or at different radial distances from the froth dispensing tube or nozzle 204.

While not illustrated, the groove or surface of the article may be pretreated to enhance bonding of the cured polyurethane foam. For example, the article may be pretreated, such as plasma treated, abraded, chemically etched, or a combination thereof.

Figure 3:
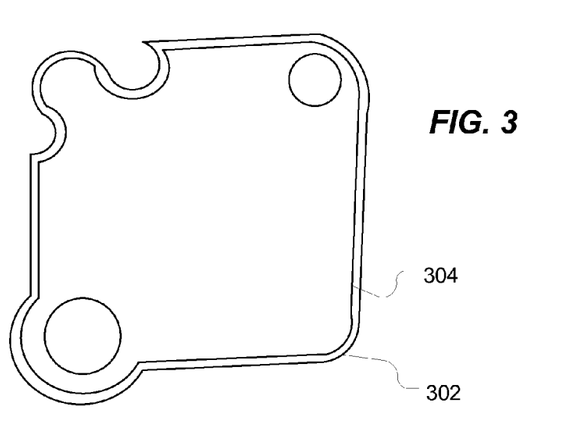
FIG. 3 includes an illustration of an exemplary component to which a gasket may be applied.

In particular, such a system is useful at dispensing polyurethane froth over an article having irregular shapes. As illustrated in FIG. 3, an article 302 may include a groove 304 around the perimeter of the article 302. Alternatively, the froth may be dispensed over a flat surface of an article 302, absent a groove. In a particular example, a froth including a one-component polyurethane precursor may be dispensed within the groove 304. Water is sprayed into the groove 304, the froth is applied over the moistened surface of the groove 304, and additional water is sprayed over the dispensed froth. While the illustrated article 302 is similar to an insert for a door panel, froth may be dispensed to form gaskets having other shapes.

Figure 4:
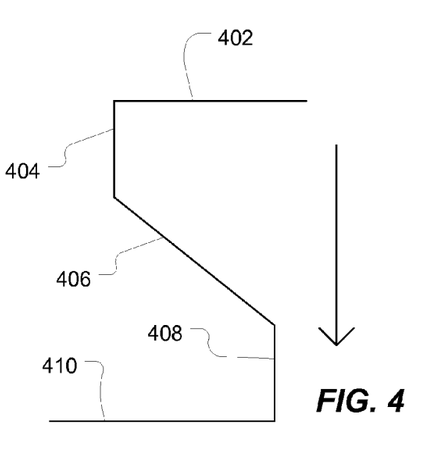
FIG. 4 includes an illustration of an exemplary surface over which a gasket may be applied.

The proposed one-component froth system is particularly useful in dispensing a froth to cure in place and form a gasket over complicated geometries. As illustrated in FIG. 4, the froth may be dispensed over a surface having a variety of orientations relative to gravity. The illustrated arrow represents the direction of gravity. A froth may be dispensed over a surface, such as surfaces 402 or 410 that are horizontal relative to the vertical direction of gravity. Alternatively, the froth may be dispensed over surfaces that are parallel to the direction of gravity, such as surfaces 404 or 408. Further, the froth may advantageously be dispensed on the underside of surfaces, such as surface 406, relative to gravity.

Figure 5:
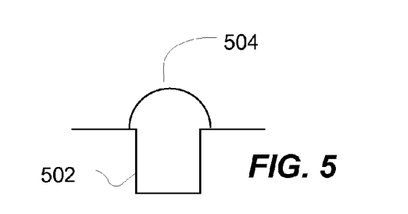
FIG. 5, FIG. 6, and FIG. 7 include illustrations of exemplary grooves into which gaskets may be applied.
Figure 6:
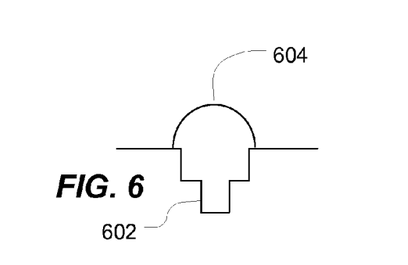
Figure 7:
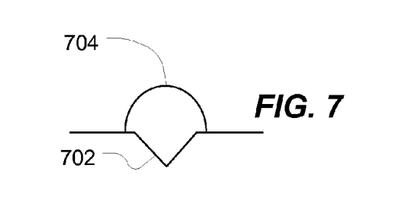

While the illustrated dispensing systems may dispense a froth over a surface that is free of a groove to form a gasket, the froth may also be dispensed into a groove. FIG. 5, FIG. 6, and FIG. 7 include illustrations of exemplary groove cross-sections into which polyurethane froth may be dispensed to form a foamed-in-place gasket. For example, FIG. 5 includes a square or rectangular groove 502 into which a froth is dispensed and cured to form a gasket 504. In an alternative example, the groove 602 has a tiered cross-section into which a polyurethane foam is dispensed to form a gasket 604.

In a further example illustrated in FIG. 7, the groove 702 may be formed as a "V" and polyurethane froth may be dispensed into the V-shaped groove 702 and cured to form a gasket 704. Various cross-sections of grooves may beneficially provide enhanced bonding to a component over which the froth is applied. As such, alternative groove cross-sections may be envisaged. In a particular example, the gasket may extend above the surface of the component in a range of 2 mm to 20 mm, such as a range of 2 mm to 10 mm, a range of 2 mm to 8 mm, or even a range of 2 mm to 5 mm.

In a particular embodiment, the dispensed froth may have a tack free cure time of not greater than 20 minutes, such as not greater than 15 minutes, when in the presence of externally supplied water. In addition, the froth may have a full cure time of not greater than 20 minutes, such as not greater than 15 minutes. As used herein, the tack free cure time and full cure time are determined at conditions of 23° C. and 50% relative humidity.

The resulting foam gasket may have a density, determined in accordance with ASTM D1056, of not greater than 350 kg/m$^3$, such as not greater than 300 kg/m$^3$, or even not greater than 280 kg/m$^3$. In an example, the density is within the range of 120 kg/m$^3$ to 350 kg/m$^3$, such as a range of 150 kg/m$^3$ to 300 kg/m$^3$, or even a range of 170 kg/m$^3$ to 280 kg/m$^3$.

In addition, the gasket may exhibit desirable mechanical properties such as elongation at break, tensile strength, compression set, compression force, and deflection force. Elongation at break and tensile strength are determined in accordance with DIN 53571. Compression set, compression force, and deflection force are measured in accordance with ASTMD 1667.

In particular, the gasket may exhibit an elongation at break of at least 70%, such as at least 85%, or even 100%. In addition, the gasket may exhibit a tensile strength of at least 15 N/cm$^2$, such as at least 18 N/cm$^2$, at least 20 N/cm$^2$, or even at least 22 N/cm$^2$. Elongation and tensile strength are tested using a Hounsfield tensile equipment with an elongation speed of 30 cm/min.

Compression set is determined by placing 10 cm long specimens between two silicone coated Mylar sheets, which in turn are topped with 4 mm to 5 mm thick glass plates. The distance between the Mylar sheets is reduced to 75% of the initial average distance and is held in place for 24 hours before allowing the sample to relax for 22 hours at 23° C. and 50% relative humidity. In particular, the compression set is not greater than 22%, such as not greater than 18%, not greater than 16%, or even not greater than 15%.

Compression force and deflection force are measured in accordance with ASTMD1667. Ten cm long samples are placed between aluminum plates. The force to compress at 30% is the force to compress the specimen to 70% of its initial height and the deflection force at 30%, measured after 60 seconds, is the force to maintain the specimen at 70% of its initial height. In an example, the force to compress is in a range of 10 N/cm$^2$ to 50 N/cm$^2$, such as 10 N/cm$^2$ to 40 N/cm$^2$, or even 20 N/cm$^2$ to 35 N/cm$^2$. The deflection force may be in a range of 20 N/cm$^2$ to 40 N/cm$^2$, such as 20 N/cm$^2$ to 35 N/cm$^2$, or even 20 N/cm$^2$ to 30 N/cm$^2$.

In addition, the gasket may exhibit a desirable hardness measured on fully cured bead using a Shore 00 durometer. For example, the Shore 00 hardness of the gasket may be in a range of 30 to 60, such as a range of 35 to 55, or even a range of 40 to 50.

In addition, the froth exhibits a desirable height to width ratio (H/W Parameter), resulting in desirable properties in the gasket. The H/W Parameter is the height to width ratio measured at 23° C. and 50% relative humidity on a foamed and fully cured bead. Several 20-cm long beads are extruded on a silicone coated Mylar sheet and cured under standard conditions (55° C. and 85% $R^H$). The beads are stored at 23° C. and 50% relative humidity for one day prior to measurement. The ratio is determined at three positions along the sample and an average of the three positions on three different beads is averaged to determine the H/W Parameter. Increased H/W Parameters are desirable because the froth exhibits less spreading, producing greater height in a gasket per unit width of the gasket. In particular, a froth having a desirable H/W Parameter utilizes narrower grooves to produce a desirable gasket having a desired height above a surface. In particular, the present one-component polyurethane froth exhibits a H/W Parameter of at least 0.3, such as at least 0.4, or even at least 0.5. The H/W Parameter may be not greater than 2.0, such as not greater than 0.8.

In addition, the gasket exhibits a desirably low absorption of water following cure. For example, the gasket has a water absorption parameter, defined as the weight percent of water absorbed by the foam at ambient conditions, of not greater than 15%, such as not greater than 10%. In a particular embodiment, the gasket is formed of a low density foam having a closed cell structure.

EXAMPLES

Each of the examples below is prepared using a froth derived from a one-component polyurethane. The one-component polyurethane is formed from between 60 wt % and 70 wt % of a mixture of polyether polyols, including ⅔ of a trifunctional polyetherpolyol with a hydroxyl number of 28 mg KOH/g and ⅓ of a trifunctional SAN-grafted polyetherpolyol with hydroxyl number of 20 mg KOH/g, available from Elastogran (BASF). In addition, the one-component polyurethane is formed from an isocyanate mixture in an amount of 25 wt % to 35 wt %. The mixture includes 79 wt % of a modified 4,4'-diphenylmethane diisocyanate with a NCO % of approx. 11.7, a functionality of 2.2-2.3 and 21 wt % of a modified 4,4'-diphenylmethane diisocyanate with a NCO % of approx. 23, a functionality of 2.05, available from Elastogran (BASF). In addition, the one-component polyurethane includes the catalyst bis-(2-(4-morpholino-) ethylether in the amount specified. Further, the one-component polyurethane includes a thixotropic silica (Areosil R200) in an amount of approximately 2.5 wt % to 3.0 wt % and other additives in amounts of less than 0.5 wt %, such as surfactants and anti-yellowing agents.

Density is measured in accordance with ASTM D1056. Tensile strength and elongation at break are measured in accordance with DIN 53571. Compression set, compression force, and deflection force are measured in accordance with ASTM D1667, as described above. Hardness is determined using a Shore 00 durometer and the H/W parameter is determined as described above.

While full cure times and tack free cure times defined above and within the claims are determined at 23° C. and 50% relative humidity, the examples measure tack free cure time and full cure time at the specified temperature and relative humidity.

Example 1

Sample formulations are prepared with catalyst in amounts of 0.27 wt %, 0.68 wt %, 1.01 wt %, and 1.35 wt %, respectively. The samples are cured under three conditions, (A) 15° C. and 52% RH, (B) 23° C. and 50% RH, and (C) 55° C. and 85% RH. Table 1 illustrates the tack free and full cure times for the samples cured under the identified conditions.

TABLE 1

| Catalyst | Tack Free/Compressible | | | Full Cure | | |
|---|---|---|---|---|---|---|
| Level | A | B | C | A | B | C |
| 0.27 wt % | ND | 30-35 | <10 | ND | 35-45 | 12 |
| 0.68 w % | 30 | 15 | <10 | >30 | 20 | <10 |
| 1.01 wt % | 25 | 10-15 | <10 | 25-30 | 15-20 | <10 |
| 1.35 wt % | 15-20 | <10 | <10 | 20 | 10-15 | <10 |

As illustrated in Table 1, the samples including at least 0.68 wt % catalyst exhibit a tack free cure time, when cured at 23° C. and 50% RH, of not greater than 15 minutes, and a full cure time of not greater than 20 minutes. In particular, samples including at least 1.35 wt % catalyst exhibit a tack free cure time and full cure time of less than 20 minutes at each of the conditions.

Example 2

Sample formulations are prepared with catalyst in an amount of 1.35 wt %. The samples are cured at 23° C. and 50% RH with or without externally applied water. Table 2 illustrates the hardness as measured at points in time for the samples cured under the identified conditions. The samples are considered tack free when hardness is at least 32.

TABLE 2

| | Hardness (Shore 00) | | Full Cure | |
|---|---|---|---|---|
| Time (min) | w/o $H_2O$ | with $H_2O$ | w/o $H_2O$ | with $H_2O$ |
| 10 | NM | 28-32 | No | No |
| 15 | NM | 32-35 | No | Yes |
| 20 | 15-25 | 34-37 | No | Yes |
| 25 | 34-37 | — | Yes | Yes |
| 30 | 37-40 | — | Yes | Yes |

As illustrated in Table 2, the samples cured in the presence of externally applied water are fully cured within 15 minutes, whereas samples cured in the absence of externally applied water fully cure after 20 minutes.

Example 3

Sample formulations are prepared with catalyst in amounts of 0.68 wt %, 1.01 wt %, and 1.35 wt %, respectively. The samples are cured at 23° C. and 50% RH with and without externally applied water. Table 3 illustrates the mechanical properties of sample gaskets formed from the sample formulations.

TABLE 3

| Mechanical Properties of Cured Sample Formulations | | | | | | |
|---|---|---|---|---|---|---|
| Catalyst Level | Density ($kg/m^3$) | H/W | Hardness (Shore 00) | Force to Compress ($N/cm^2$) | Deflection ($N/cm^2$) | Compression Set (%) |
| 0.68 wt % w/water | 245 | 0.45 | 44 | 30.2 | 25.8 | 15 |
| 1.01 wt % w/water | 255 | 0.50 | 47 | 27.9 | 23.0 | 18 |
| 1.35 wt % w/water | 245 | 0.51 | 42 | 27.5 | 22.0 | 17 |
| 0.68 wt % w/o water | 280 | 0.57 | 50 | 38.8 | 33.7 | 14 |
| 1.01 wt % w/o water | 273 | 0.56 | 46 | 36.5 | 31.2 | 14 |
| 1.35 wt % w/o water | 268 | 0.60 | 44 | 31.0 | 25.4 | 13 |

As illustrated in Table 3, the samples cured in the presence of externally applied water exhibit lower density than the samples cured absent externally applied water. In addition, the samples cured in the presence of water exhibit desirably lower force to compress and deflection force than samples cured absent externally applied water. Other properties, such as tensile strength and elongation at break are comparable between the cured samples.

Example 4

Sample formulations are prepared with catalyst in amounts of 0.68 wt %, 1.01 wt %, and 1.35 wt %, respectively. The samples are deposited over a surface having an initial temperature of 40° C. and are cured at 23° C. and 50% RH with externally applied water. Table 5 illustrates the mechanical properties of sample gaskets formed from the sample formulations.

TABLE 4

Properties of Sample Gaskets

| Catalyst (wt %) | Density (kg/m³) | H/W | Elongation (%) | Tensile Strength (N/cm²) | Force to Compress (N/cm²) | Deflection (N/cm²) | Comp. Set (%) | Hardness (Shore 00) |
|---|---|---|---|---|---|---|---|---|
| 0.68 | 245 | 0.46 | 146 | 25 | 28 | 23 | 15 | 43 |
| 1.01 | 258 | 0.50 | 147 | 27 | 28 | 23 | 17 | 47 |
| 1.35 | 247 | 0.51 | 147 | 25 | 27 | 22 | 18 | 42 |

As illustrated in Table 4, the properties for samples formed for different levels of catalyst exhibit comparable mechanical properties.

Embodiments of the gaskets formed in accordance with the described method advantageously exhibit desirable properties. In particular, the gaskets have a low density and excellent mechanical properties. In addition, the froth cures with desirably low cure times in ambient conditions.

In a first embodiment, a method of forming a seal includes preparing a froth from a one component polyurethane precursor; applying the froth to a surface of an article; and simultaneously applying water with the froth. The froth cures to form a gasket having a density not greater than 350 kg/m³ bonded to the article.

In an example of the first embodiment, curing the froth includes curing in ambient conditions, absent artificial ambient humidity.

In another example of the first embodiment, applying the water includes applying the water to the article and the froth over the water, or applying the water over the froth, or separately spraying the water.

In a further example of the first embodiment, the froth has a tack free cure time of not greater than 20 minutes, such as not greater than 15 minutes. In an additional example, the froth has a full cure time of not greater than 30 minutes, such as not greater than 20 minutes.

In an example of the first embodiment, the one component polyurethane precursor has a viscosity of 30 Pa-s to 250 Pa-s when measured at 40° C., such as 30 Pa-s to 200 Pa-s.

In another example of the first embodiment, preparing the froth includes preparing the froth with at least 5 vol % of an inert gas, such as with at least 10 vol % of the froth.

In a further example of the first embodiment, the density is not greater than 300 kg/m³.

In an additional example of the first embodiment, the amount of catalyst is in the range of 0.6 wt % to 1.8 wt %, such as in the range of 0.8 wt % to 1.8 wt %.

In an example of the first embodiment, the froth has an H/W Parameter of at least 0.3, such as at least 0.4, or at least 0.5. The H/W Parameter can be not greater than 2.0.

In another example of the first embodiment, the gasket has a Shore 00 hardness in the range of 30 to 60, such as in the range of 40 to 50. In an additional example of the first embodiment, the gasket has a water absorption parameter of not greater than 15, such as not greater than 10.

In a further example of the first embodiment, the gasket has an elongation of at least 70%, such as at least 85%, or at least 100%. In another example, the gasket has a tensile strength of at least 15 N/cm². The gasket can have a deflection force at 30% compression in the range of 20 N/cm² to 40 N/cm².

In a second embodiment, a method of forming a gasket includes applying water into a groove of a component, dispensing a froth comprising a one component polyurethane into the groove, the froth comprising a catalyst in an amount of 0.2 wt % to 2.0 wt %, and applying water over the dispensed froth. The froth cures to form a gasket having a density of not greater than 350 kg/m³.

In an example of the second embodiment, curing the froth includes curing in ambient conditions, absent artificial ambient humidity. In another example of the second embodiment, the froth has a tack-free cure time of not greater than 20 minutes, such as not greater than 15 minutes. In a further example of the second embodiment, the froth has a full cure time of not greater than 30 minutes, such as not greater than 20 minutes.

In an additional example of the second embodiment, the method further includes preparing a froth from the one component polyurethane. Preparing the froth can include preparing the froth with at least 5 vol % of an inert gas, such as at least 10 vol % of the of an inert gas. In an example of the second embodiment, the density is not greater than 300 kg/m³.

In another example of the second embodiment, the amount of catalyst is in the range of 0.6 wt % to 1.8 wt %, such as in the range of 0.8 wt % to 1.8 wt %.

In a further example of the second embodiment, the froth has an H/W Parameter of at least 0.3, such as at least 0.4 or at least 0.5. The H/W Parameter is not greater than 2.0.

In an additional example of the second embodiment, the gasket has a Shore 00 hardness in the range of 30 to 60, such as in the range of 40 to 50. In another example of the second embodiment, the gasket has a water absorption parameter of not greater than 15, such as not greater than 10.

In an example of the second embodiment, the gasket has an elongation of at least 70%, such as at least 85% or at least 100%. In another example, the gasket has a tensile strength of at least 15 N/cm². In a further example, the gasket has a deflection force at 30% compression in the range of 20 N/cm² to 40 N/cm².

In a third embodiment, a method of forming a seal includes applying water to a surface of a component, applying a froth over the water, the froth comprising a one component polyurethane, and applying water over the froth. The froth cures to form a seal having a density not greater than 350 kg/m³ bonded to the surface of the component.

In a fourth embodiment, a gasket includes a foam including polyurethane matrix and at least 0.8 wt % of a catalyst. The foam has a density of not greater than 350 kg/m³ and a primarily closed cell structure. In an example of the fourth embodiment, the density is not greater than 300 kg/m³.

In another example of the fourth embodiment, the amount of catalyst is in the range of 0.8 wt % to 1.8 wt %.

In a further example of the fourth embodiment, the gasket has a Shore 00 hardness in the range of 30 to 60. In an additional example, the gasket has a water absorption parameter of not greater than 15. In another example, the gasket has an elongation of at least 70%. In a further example, the gasket has a tensile strength of at least 15 N/cm². In another example, the gasket has a deflection force at 30% compression in the range of 20 N/cm² to 40 N/cm².

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of forming a seal, the method comprising:
   preparing a froth from a one component polyurethane precursor;
   applying the froth to a surface of an article by dispensing the froth from a dispenser; and
   applying water with the froth by separately dispensing the water from the dispenser, the froth curing to form a gasket having a density not greater than 350 kg/m$^3$ bonded to the article.

2. The method of claim 1, wherein curing the froth includes curing in ambient conditions, absent artificial ambient humidity.

3. The method of claim 1, wherein applying the water includes applying the water to the article and the froth over the water.

4. The method of claim 1, wherein applying the water includes applying the water over the froth.

5. The method of claim 1, wherein applying the water includes separately spraying the water.

6. The method of claim 1, wherein the froth has a tack free cure time of not greater than 20 minutes.

7. The method of claim 1, wherein the froth has a full cure time of not greater than 30 minutes.

8. The method of claim 1, wherein the one component polyurethane precursor has a viscosity of 30 Pa-s to 250 Pa-s when measured at 40° C.

9. The method of claim 1, wherein preparing the froth includes preparing the froth with at least 5 vol % of an inert gas.

10. The method of claim 1, wherein the density is not greater than 300 kg/m$^3$.

11. The method of claim 1, wherein the amount of catalyst is in the range of 0.6 wt % to 1.8 wt %.

12. The method of claim 1, wherein the froth has an H/W Parameter of at least 0.3.

13. The method of claim 1, wherein the gasket has a Shore 00 hardness in the range of 30 to 60.

14. The method of claim 1, wherein the gasket has a water absorption parameter of not greater than 15.

15. The method of claim 1, wherein the gasket has a deflection force at 30% compression in the range of 20 N/cm$^2$ to 40 N/cm$^2$.

16. The method of claim 1, wherein the density is within the range of about 120 kg/m$^3$ to 350 kg/m$^3$.

17. The method of claim 1, wherein a dispenser dispenses the froth and the water simultaneously.

18. A method of forming a gasket, the method comprising:
   applying water into a groove of a component;
   dispensing a froth from a dispenser, the froth comprising a one component polyurethane only along a pathway defined by the groove, the froth comprising a catalyst in an amount of 0.2 wt % to 2.0 wt %; and
   applying water over the dispensed froth by separately dispensing the water from the dispenser, the froth curing to form a gasket having a density within the range of about 120 kg/m$^3$ to 350 kg/m$^3$.

19. The method of claim 18, wherein curing the froth includes curing in ambient conditions, absent artificial ambient humidity.

20. The method of claim 18, further comprising preparing a froth from the one component polyurethane.

21. The method of claim 18, wherein preparing the froth includes preparing the froth with at least 5 vol % of an inert gas.

22. The method of claim 18, wherein the density is not greater than 300 kg/m$^3$.

23. The method of claim 18, wherein the amount of catalyst is in the range of 0.6 wt % to 1.8 wt %.

24. The method of claim 18, wherein the froth has an H/W Parameter of at least 0.3.

25. The method of claim 18, wherein the gasket has a Shore 00 hardness in the range of 30 to 60.

26. The method of claim 18, wherein the gasket has a water absorption parameter of not greater than 15.

27. A method of forming a seal, the method comprising:
   applying a froth to a surface of a component, the froth comprising a one component polyurethane; and
   simultaneously applying water to the same location as the froth, the froth curing to form a seal having a density within the range of about 120 kg/m$^3$ to 350 kg/m$^3$ bonded to the surface of the component.

* * * * *